United States Patent [19]

Rumpf

[11] 4,143,913
[45] Mar. 13, 1979

[54] SEAT BACK HINGE

[75] Inventor: Robert J. Rumpf, Grosse Pointe, Mich.

[73] Assignee: The Firestone Tire & Rubber Company, Akron, Ohio

[21] Appl. No.: 815,918

[22] Filed: Jul. 15, 1977

[51] Int. Cl.$^2$ .............................................. B60N 1/02
[52] U.S. Cl. .................................................... 297/379
[58] Field of Search ............... 297/216, 379, 378, 366; 74/575, 576, 577 R, 577 S, 577 FS; 242/107.4 A

[56] References Cited

U.S. PATENT DOCUMENTS

| 3,549,202 | 12/1970 | Boschen et al. | 297/379 |
| 3,628,831 | 12/1971 | Close | 297/379 |
| 3,848,923 | 11/1974 | Dehler | 297/379 X |
| 3,900,225 | 8/1975 | Wirtz et al. | 297/367 |
| 3,901,460 | 8/1975 | Dully et al. | 242/107.4 A |
| 4,010,979 | 3/1977 | Fisher et al. | 297/379 |

Primary Examiner—Roy D. Frazier
Assistant Examiner—William E. Lyddane
Attorney, Agent, or Firm—Miller, Morriss and Pappas

[57] ABSTRACT

An improved inertially locking hinge for vehicular seats which permits the seat back to be pivoted downwardly when the vehicle is not subjected to inertial forces but which, under the influence of selected inertial forces, causes a simple metal block element to pivot into engagement with ratchet teeth on the movable of the hinge elements. Weight and space savings are achieved by using a small thrust carrying block element secured in a plastic case and the case is pivotal in a slightly arcuate opening and the case enclosing a mass positioned to act between parallel spaced-apart fixed plates, the plates pivotally supporting the principal hinge point and seat back support. The block element carries the thrust of the teeth into the fixed plates at a buttress at the arcuate opening.

5 Claims, 5 Drawing Figures

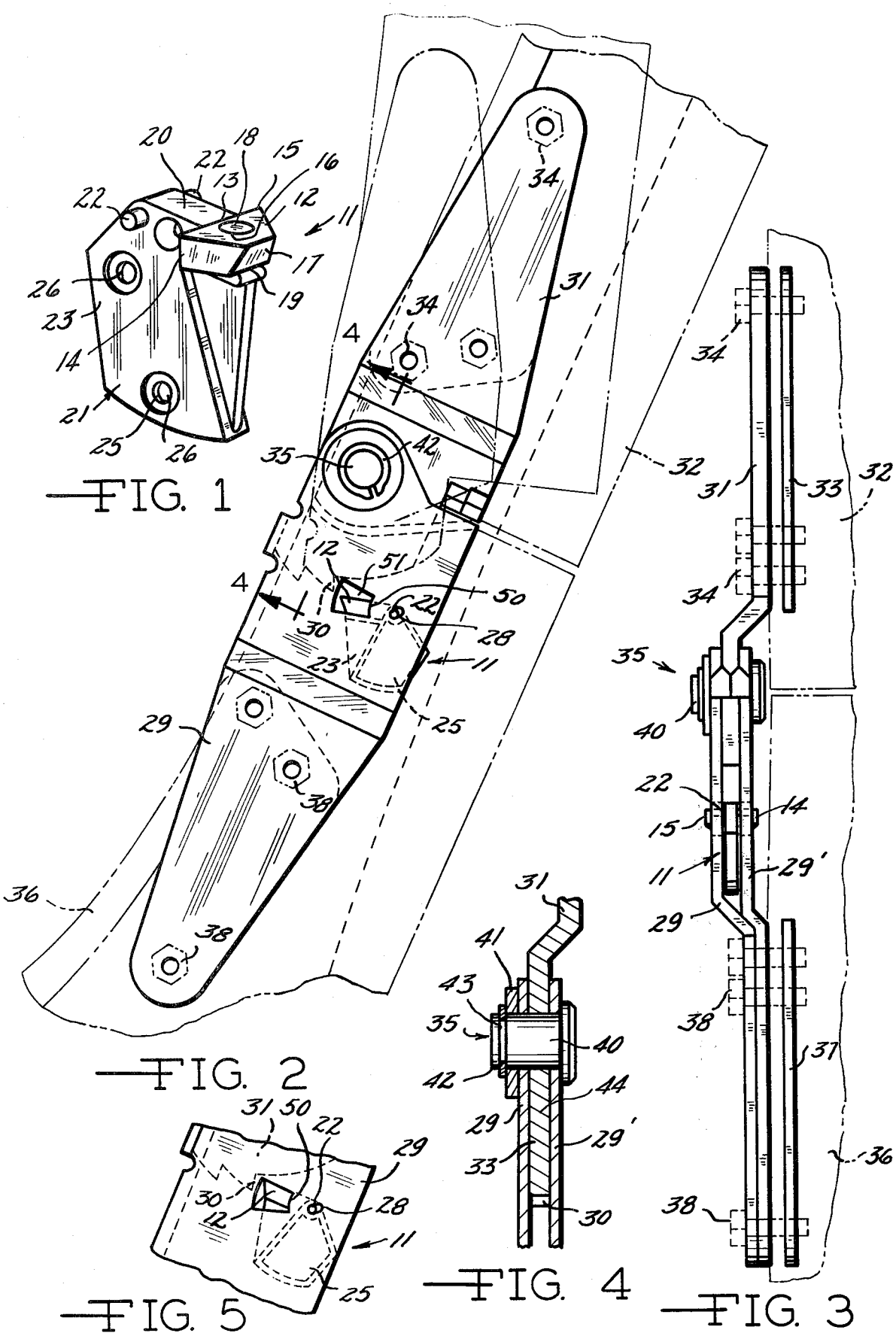

SEAT BACK HINGE

BACKGROUND OF THE INVENTION

The automotive industry has sought for a seat back hinge that locks inertially and in which the threshold of sensitivity to inertial imbalance is selectively adjustable and that is sufficiently compact and efficient as to avoid addition of mechanism weight, added space, and that easily self unlocks when the inertially sensed crisis (braking or impact) is over. Economy is also a principal factor in finding a suitable inertial seat back hinge. For example, it is desirable to be able to swing the hinged seats downwardly when the vehicle is stopped or in normal non-decelerating motion without the requirement of manipulating locks and latches and so that the hinge is at all times prepared to lock when a crisis or emergency is inertially sensed.

The prior art includes latches which must be tripped manually and it includes pendulum locks that are both bulky and complex. Some hinges are specially actuated by complex mechanical linkages. Such devices are represented in the U.S. Pat. Nos. 3,549,202, 3,628,831 and 3,674,307 and are distinguishable from the present structure.

GENERAL DESCRIPTION

In general, the present invention comprises a small hardened metal pawl or block element impaled on and supported by an encasing pivot frame made from plastic material such as Delrin (the trademark of a plastic product from I.E. DuPont de Nemours and Company) or a plastic resin such as polyethylene and having good dimensional stability and strength at the temperatures normally encountered in automotive vehicles and which provides good reproducible injection molded and cast parts so as to encapsulate a high density disc located in the depending plastic lobe to provide the selected sensitivity. The inertial element (pendulum) is pivotally supported between a pair of fixedly positioned hinge plates and guide wing portions of the metal pawl extend through arcuate apertures generated between a pair of radii from a pivot pin establishing a pivotal support for the pawl element through the fixed hinge plates. A separable movable hinge plate is hinged to and between the pair of fixed hinge plates. The movable hinge plate includes ratchet teeth surrounding the principal pivot and generally radially extending therefrom in a normal clearance relation to the pawl element. Sudden stopping, impact or fast deceleration causes the pawl element to rotate on its pivot by reason of the pendulum action in the pawl piece and causes the pawl element to rise to an interference position in respect to the ratchet. As the seat back strains forwardly to fold down, the ratchet closes on the pawl forcing the pawl into thrust lock shouldering relation against both spaced-apart fixed hinge plates at the arcuate slot. To assure lock engagement and subsequent restoration to unlock condition, the pivot support for the pawl support element is provided with a clearance. When the stress is removed, the pawl support and block element falls free of the teeth under the gravity influence of the mass in the depending lobe of the pawl support element. The inertial seat back hinge is simple, trouble-free and exceptionally compact and useful in a wide variety of simple and compound hinges as applied to automotive seating.

The principal object is to provide a new and improved seat back hinge with simplified inertial control over locking. Other objects including economy in space, weight and installational and manufacturing costs will be appreciated as the description proceeds.

IN THE DRAWINGS

FIG. 1 is an enlarged perspective view of a pendulum pawl piece in accord with the present invention and including the small metal pawl element, the encasement and impaling support with locating shoulder for the pawl element and illustrating the case integral pivot trunnions. The weights are selectively positioned inside the plastic encasement to provide selected inertial sensitivity.

FIG. 2 is a side elevation view of a hinge in accord with the present invention and shows a full hinge located and secured to a functioning seat bottom and seat back, the latter in phantom-line shown as tilted forward as where the vehicle in which the hinge is mounted and tilted forward as to allow movement to a rear seat. The pawl piece is at rest position.

FIG. 3 is a full end elevation of the hinge structure shown in FIG. 2 and indicating the spaced relation between the two fixed hinge plates with the pawl piece supported therebetween and indicating that both fixed and movable hinge plates are fastened to structural seat supports as by the sandwich plates and fasteners indicated.

FIG. 4 is a cross section end elevation view through the fixed and movable hinge plates at the principal hinge pivot and indicating the ratchet extension of the movable hinge plate.

FIG. 5 is a partial side elevation view through the arcuate guide slot of the pawl piece and showing the pawl piece rotated on its pivot as from the inertial influence of sudden braking and causing the eccentric high density mass in the pawl piece to cause rotation of the pawl piece as shown and to place the small metal pawl element in lock relation with the ratchet in prevention of seat back collapse.

SPECIFIC DESCRIPTION

By specific reference to the FIG. 1 of the drawings, the composite pendulum pawl piece 11 is shown. The pawl element or block 12 is essentially a single pawl tooth having a plane rear surface 13, a thickness substantially equal to the ratchet tooth depth and in plan shaped triangularly with wide wings 14 and 15 extending transversely of the axis passed through the opening 16 and on either side of an imaginary plane passed transversely through the axis of the opening and the center of the plane rear surface 13 and the imaginary plane also passing the center of the undercut tooth edge 17 formed by the oblique truncation of element 12 in removal of the forward apex of the triangularly configured piece.

It is observed that the pawl element or block 12 is impaled on a post 18 which extends upwardly through the opening 16 and the post is flared as by heat tamping and wiped flush with the top surface of the pawl element 12 and together with the upper plane of the step 19 and back rest 20 provides ridged and precision buttress location of the pawl element 12. The pawl element 12 is metal and is preferred as a sintered metal hardened part since, as will be seen, all lock stresses are carried by the small element 12 from one hinge plate and into the others.

The metal pawl element or block 12 is supported by a plastic case 21 configured as shown, for example, by molding to precision support and having integral trunnion pivot elements 22 integrally extending from the depending lobe-like body section 23. The body 23 selectively locates and encloses a high density metal mass 25 (such as lead). When supported on the trunnions 22 the center of mass 25 normally is below the trunnions 22. The locating openings 26 assist in positioning the mass 25 for precision injection molding. The positioning and weight of the mass 25 is adjustable to accommodate selected sensitivity since it is undesirable to cause locking under moderate inertial imbalance situations caused by normal deceleration. In order to provide an appreciation for size and space reduction, it is important to appreciate that in FIG. 1 the pendulum pawl piece 11 is about double the size of units actually used in operating vehicle slot hinges.

In FIGS. 2 and 3 the pendulum pawl piece 11 is placed in its use setting pivotally supported on the trunnions 22 in the clearance pivot support openings 28 in the spaced-apart fixed hinge plates 29 and 29'. This, the pawl piece 11 depends between the fixed hinge plates 29 and 29' on the trunnions 22 and the lobe portion 23 of the case 21 which carries the mass 25 is normally retained out of engagement with the ratchet teeth 30 provided on the movable hinge plate 31. The movable hinge plate 31 is secured to the structure of seat back 32 as by the sandwich plate 33 and fasteners 34 so that the seat back 32 is movable forwardly on the principal hinge pivot 35. The immovable or fixed hinge plates are secured to the structural parts of the seat bottom 36 by the sandwich plate 37 and fasteners 38. Other support means are useable but the illustrated fastening is considered typical in automotive seating.

In some instances it is desirable that the planes of the hinge plates 29-29' (fixed) and 31 (movable) at the point of connection to the seat bottom or base 36 and seat back 32 be canted at an angle different than the plates at the main pivot or hinge 35. This is to accommodate the particular framing of the seat elements.

In FIG. 4 the main hinge point or pivot 35 is illustrated in the partial cutaway sectin as comprising the headed pin 40 passing through the movable hinge plate 31 and the spaced-apart fixed hinge plates 29 and 29'. A thrust washer 41 is provided to bear on the fixed plate 29 and the snap ring 42 drops into the annular groove 43 of the pin 40 securing the assembly together. The cam-like lobe 44 of the movable plate 31 extends below the principal pivot 35 and integrally includes the ratchet teeth 30 which rotate around the pivot 35 in accord with movement of the plate 31.

FIG. 5 shows the lock-up situation for the pendulum pawl element 11 when the pendulum pawl element 11 is under the influence of an inertial force in a vehicle imposed situation by sudden or precipitious deceleration or braking. The mass 25 in the body 23 of the inertial element 11 causes rotation of the pawl element 11 and pawl piece 12 in a clockwise direction, as shown, and the pawl piece rises to interference relation with the ratchet teeth 30 in prevention of the movement of the movable hinge plate 31. The impact force of the counterclockwise applied energy from the seat back 32 causes a jamming stress on the pawl piece 12 driving it into shouldering relation against the buttress 50 at the rear of the opening 51 and causes slight displacement of the pawl pivot 22 in the clearance slotted opening 28 as shown. Unless displaced as indicated in FIG. 5, the seat is unlocked and the bi-directional sensing of the pawl 12 must occur before the seat back movement is disabled. The movable plate 31 has shoulders which act as stops against the fixed plates 29-29' limiting the initial reclined position of the seat. As will be appreciated, the movable plate 31 is secured to the seat back. The fixed hinge plates 29 and 29' are secured to the seat frame or base and on each side of a seat such as a bucket seat. The fixed hinge plates 29 and 29' support pivotally the movable plate 31 therebetween and the pendulum pawl piece 12. The fixed plates 29-29' are in juxtaposed relation having a principal journal opening for the pivot pin 40 and a slotted opening 28 for journalling the pendulum pawl element 11 and the arcuate window openings 51 with buttress 50 for the lateral extensions 14 and 15 of the pawl piece 12.

In operation in automobiles having movable seat backs, the present invention has worked effectively and allows maximum freedom of movement with assurance that, under sudden stressing, the hinge will be interrupted as the pawl piece 12 rises to engage the teeth 30 of the hinge plate 31. The lock-up of the block 12 thrusting against the flanking fixed plates 29 and 29' takes full load without jamming.

Having described at least one preferred embodiment of the present invention, those skilled in the art will appreciate changes, modifications and improvements in the invention within the skill of the art and such changes, modifications and improvements are intended to be included in the spirit of the invention limited only by the scope of the claims in the present application.

I claim:

1. An inertial seat back hinge lock element swingable in a bi-directional manner between a pair of fixed spaced-apart hinge plates having registering thrust buttresses and said lock element lockably engageable against a tooth on a movable hinge plate pivotally mounted between said fixed hinge plates, the lock comprising:

a pivotal pendulum between the fixed hinge plates having a body, a hardened pawl block insert, and integral trunnions, said pendulum swinging on said trunnions to engage said pawl block against said tooth of said movable hinge plate and said pawl block including lateral extensions engageable with said thrust buttresses in said fixed plates when said block is engaged with said tooth of said movable block.

2. In the combination of claim 1 wherein said pivotal pendulum body is made of a resin plastic material including said trunnions and said body having an encased mass beneath said trunnions, and said hardened pawl block insert being seated on said resin plastic body.

3. An inertia locking seat hinge comprising:

a pair of parallel spaced-apart juxtaposed fixed plates having registering principal journal openings therethrough and registering slotted journal openings therethrough offset from said principal journal openings and registering arcuate windows opening on a radius from said slotted journal openings;

a movable plate intermediate said fixed plates having a journal opening and having a depending cam-like lobe including at least one integral tooth;

a principal pivot pin through said fixed plates at said principal journal opening and pivotally through said journal opening of said movable plate and said at least one tooth movable in an arc about said pivot; and a pendulum-like pawl piece between said fixed plates and pivoted in said slotted journal openings having a hardened pawl block, said pawl block extending laterally through said arcuate openings in said fixed plates, said pendulum-like pawl piece displaceable inertially between said fixed plates in said slotted journal openings into a path interrupting motion of said movable plate by engagement with said tooth thereof and portions of said fixed plates defining said windows.

4. An inertia locking seat hinge comprising the structure of claim 3 in which said pendulum-like pawl includes a plastic body encasing a high mass weight and said body having a pair of integral trunnions above said weight and a body integral post element; and a hardened metal block impaled on said post element and secured thereto for movement therewith, said block having wing portions extending laterally into said arcuate window openings.

5. An inertial locking seat hinge in accord with the claim 4 wherein said post element at assembly is melted and wiped into said impaled block.

* * * * *